United States Patent
Fujii et al.

(10) Patent No.: US 12,095,044 B2
(45) Date of Patent: Sep. 17, 2024

(54) BATTERY PACK WITH ANTENNA FOR POWER TOOL AND POWER TOOL INCLUDING BATTERY PACK WITH ANTENNA

(71) Applicant: KYOCERA CORPORATION, Kyoto (JP)

(72) Inventors: Katsushige Fujii, Yokohama (JP); Shinji Tsuda, Tokyo (JP)

(73) Assignee: KYOCERA CORPORATION, Kyoto (JP)

( * ) Notice: Subject to any disclaimer, the term of this patent is extended or adjusted under 35 U.S.C. 154(b) by 495 days.

(21) Appl. No.: 17/434,413

(22) PCT Filed: Feb. 28, 2019

(86) PCT No.: PCT/JP2019/007896
§ 371 (c)(1),
(2) Date: Aug. 27, 2021

(87) PCT Pub. No.: WO2020/174673
PCT Pub. Date: Sep. 3, 2020

(65) Prior Publication Data
US 2022/0149446 A1    May 12, 2022

(51) Int. Cl.
*H01M 10/46* (2006.01)
*B25F 5/02* (2006.01)
(Continued)

(52) U.S. Cl.
CPC .......... *H01M 10/425* (2013.01); *B25F 5/02* (2013.01); *H01M 10/48* (2013.01);
(Continued)

(58) Field of Classification Search
CPC ...... H02J 7/0045; H02J 7/0044; H02J 7/0042; H01M 10/425; H01M 10/48;
(Continued)

(56) References Cited

U.S. PATENT DOCUMENTS

| | | |
|---|---|---|
| 2001/0008424 A1 | 7/2001 | Higuchi et al. |
| 2005/0001585 A1 | 1/2005 | Tashiro |
| 2010/0138087 A1 | 6/2010 | Takaoka |
| 2011/0012560 A1 | 1/2011 | Sakakibara |

(Continued)

FOREIGN PATENT DOCUMENTS

| | | |
|---|---|---|
| JP | H9297166 A | 11/1997 |
| JP | 200013119 A | 1/2000 |

(Continued)

OTHER PUBLICATIONS

Machine translation of JP2002260611A (Sep. 13, 2002) (Year: 2002).*

*Primary Examiner* — Edward Tso
(74) *Attorney, Agent, or Firm* — HAUPTMAN HAM, LLP

(57) ABSTRACT

A battery pack for a power tool includes a housing, at least one battery, a connector, a first antenna, and a first communication circuit. The housing is detachably attachable to a power tool body. The housing includes a first wall, a second wall opposite to the first wall, and a third wall connecting a periphery of the first wall to a periphery of the second wall. The battery is in an internal space of the housing defined by the first wall, the second wall, and the third wall. The connector is nearer the first wall than the battery to feed power from the battery to the power tool body. The first communication circuit performs communication with the first antenna. The first antenna is at the first wall, at the third wall, or in an area in the internal space other than an area between the battery and the second wall.

14 Claims, 8 Drawing Sheets

(51) Int. Cl.
*H01M 10/42* (2006.01)
*H01M 10/48* (2006.01)
*H01M 50/213* (2021.01)
*H01M 50/247* (2021.01)
*H01M 50/296* (2021.01)
*H01M 50/543* (2021.01)
*H02J 7/00* (2006.01)

(52) U.S. Cl.
CPC ....... *H01M 50/213* (2021.01); *H01M 50/247* (2021.01); *H01M 50/296* (2021.01); *H01M 50/543* (2021.01); *H02J 7/0044* (2013.01); *H02J 7/0045* (2013.01); *H01M 2220/30* (2013.01)

(58) Field of Classification Search
CPC ............. H01M 50/213; H01M 50/543; H01M 50/296; H01M 50/247; H01M 2220/30; B25F 5/02
USPC .................. 320/103, 107, 112, 114, 132, 149
See application file for complete search history.

(56) References Cited

U.S. PATENT DOCUMENTS

| | | |
|---|---|---|
| 2012/0162028 A1 | 6/2012 | Kubo et al. |
| 2013/0300191 A1 | 11/2013 | Takaoka |
| 2016/0006085 A1 | 1/2016 | Toya |
| 2016/0087314 A1 | 3/2016 | Arashima et al. |
| 2016/0226278 A1 | 8/2016 | Wenger et al. |

FOREIGN PATENT DOCUMENTS

| | | | |
|---|---|---|---|
| JP | 2000209013 A | 7/2000 | |
| JP | 2002260611 A | 9/2002 | |
| JP | 2004335249 A | 11/2004 | |
| JP | 3952253 B2 | 8/2007 | |
| JP | 2008213069 A | 9/2008 | |
| JP | 2008213086 A | 9/2008 | |
| JP | 2008295159 A | 12/2008 | |
| JP | 2012147407 A | 8/2012 | |
| JP | 2014107640 A | 6/2014 | |
| WO | 2009118963 A1 | 10/2009 | |
| WO | 2014167889 A1 | 10/2014 | |
| WO | WO-2020079474 A1 * | 4/2020 | .......... H02J 7/00036 |

* cited by examiner

BATTERY PACK WITH ANTENNA FOR POWER TOOL AND POWER TOOL INCLUDING BATTERY PACK WITH ANTENNA

CROSS-REFERENCE TO RELATED APPLICATION

The present application is a National Phase entry based on PCT Application No. PCT/JP2019/007896 filed on Feb. 28, 2019, entitled "BATTERY PACK FOR ELECTRIC TOOL AND ELECTRIC TOOL".

FIELD

Embodiments of the present disclosure relate to a battery pack for a power tool and to a power tool.

BACKGROUND

A batter pack attached to a power tool body described in, for example, Japanese Unexamined Patent Application Publication No. 2008-213069 incorporates an antenna.

SUMMARY

A battery pack for a power tool and a power tool are described. In one embodiment, the battery pack for a power tool includes a housing, at least one battery, a connector, a first antenna, and a first communication circuit. The housing is attachable to a power tool body in a detachable manner. The housing includes a first wall, a second wall opposite to the first wall, and a third wall connecting a periphery of the first wall to a periphery of the second wall. The at least one battery is located in an internal space of the housing defined by the first wall, the second wall, and the third wall. The connector is located nearer the first wall than the at least one battery to feed power from the at least one battery to the power tool body. The first communication circuit performs communication with the first antenna. The first antenna is located at the first wall, at the third wall, or in an area in the internal space other than an area between the at least one battery and the second wall.

In one embodiment, the power tool includes the above battery pack and the above power body tool.

DETAILED DESCRIPTION

First Embodiment

Figure 1:
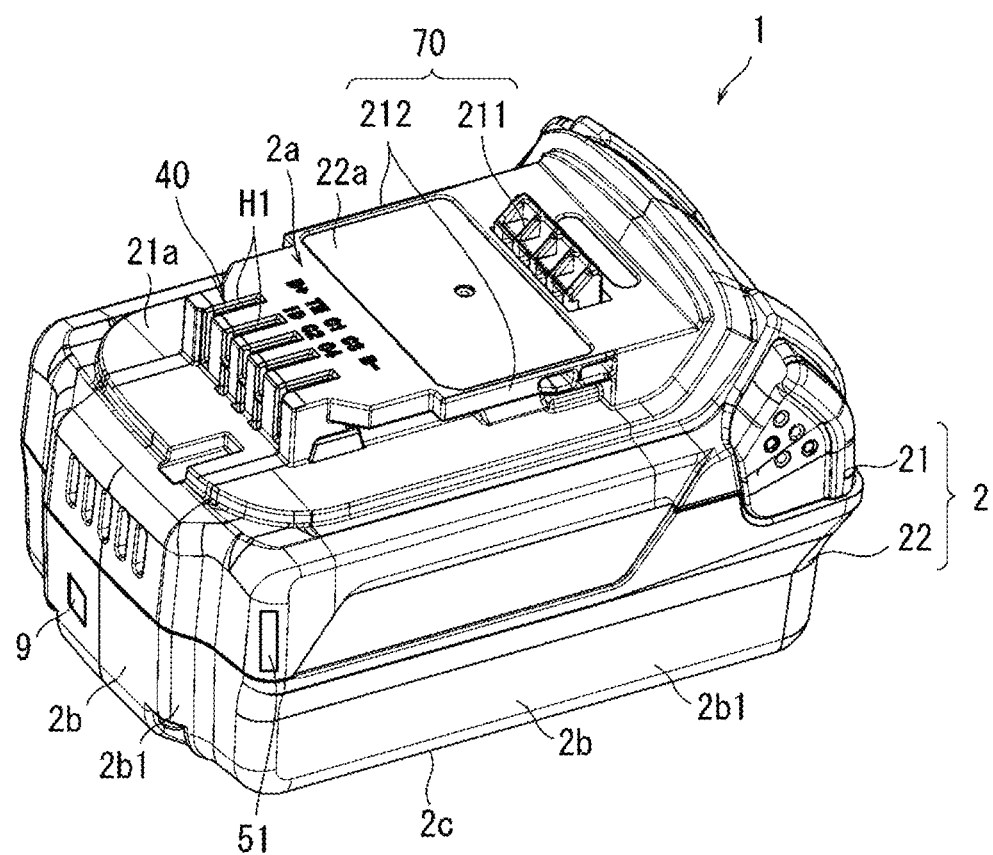
FIG. 1 illustrates a schematic perspective view of a battery pack in an example, showing its external appearance.
Figure 2:
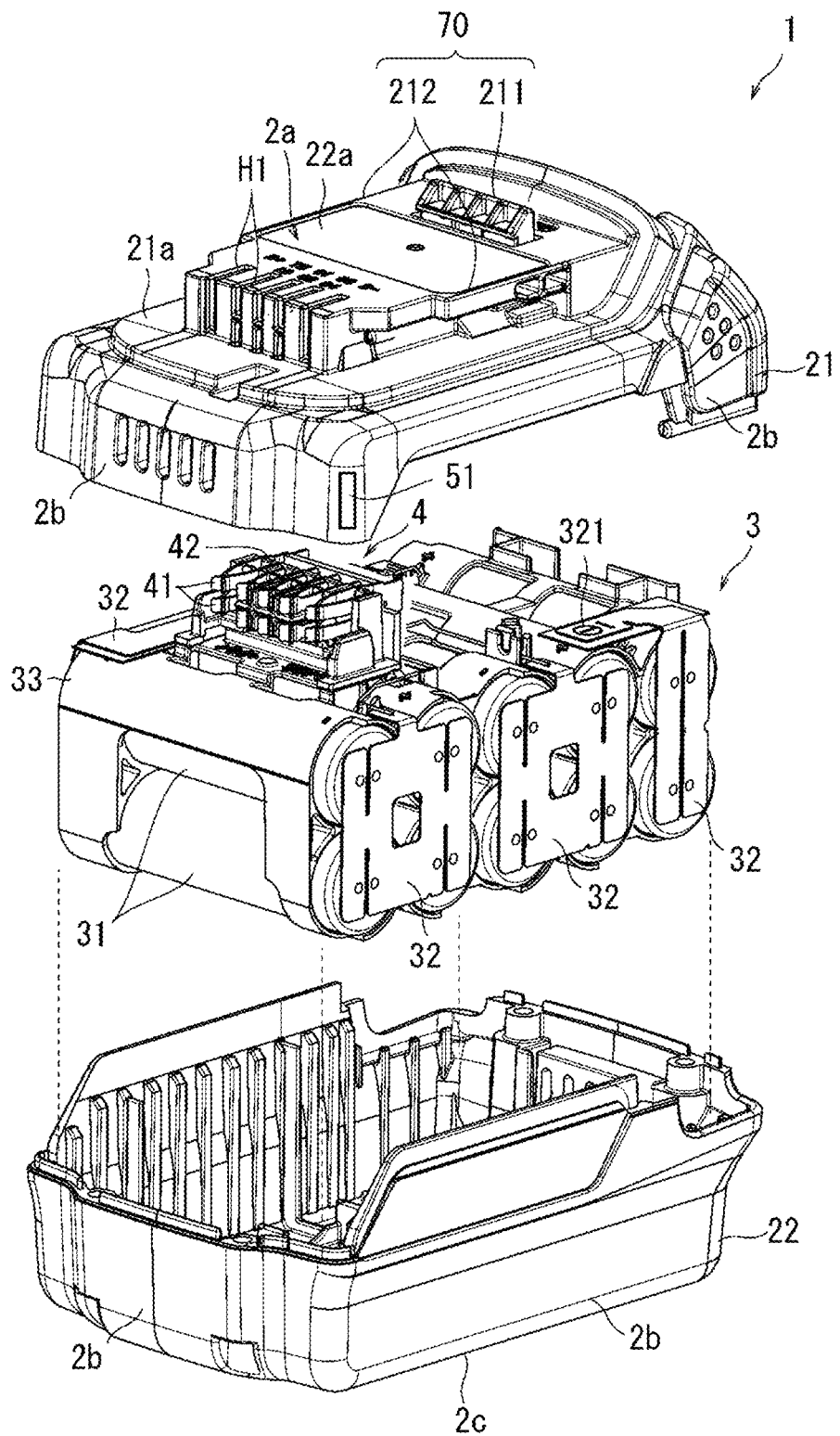
FIG. 2 illustrates a schematic exploded perspective view of the battery pack in an example.

FIG. 1 is a schematic perspective view of a battery pack 1 in an example, showing its external appearance. FIG. 2 is a schematic exploded perspective view of the battery pack 1 in an example. The structure of the battery pack 1 will be hereafter described using an up-down direction up-down direction, a right-left direction, and a front-rear direction. These directions are defined with respect to the battery pack 1. Thus, for example, the term being up or upward does not always mean vertically upward.

The battery pack 1 is a battery pack for a power tool. The battery pack 1 is attachable to a charger (not shown) in a detachable manner. The battery pack 1 is attached to the charger for charging.

Figure 3:
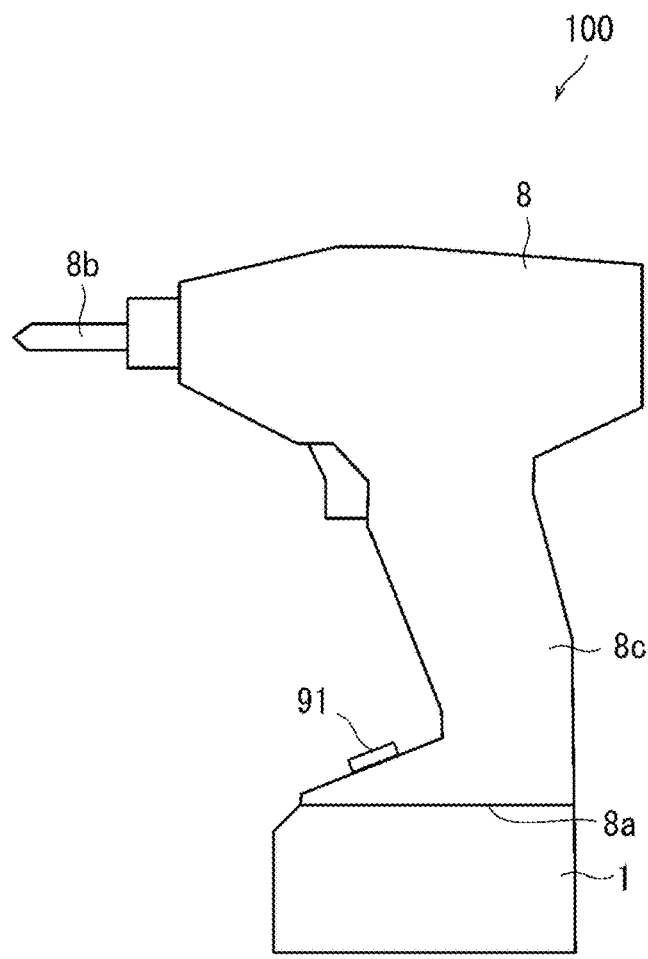
FIG. 3 illustrates a partial schematic side view of a power tool in an example.

FIG. 3 is a schematic side view of a power tool 100 in an example. The battery pack 1 is attachable to a power tool body 8 in a detachable manner. The power tool body 8 with the battery pack 1 attached then together function as the power tool 100. In an example in FIG. 3, the power tool 100 is an electric screwdriver. The power tool 100 may be any other power tool, such as an electric drill or an electric circular saw.

The power tool body 8 has a battery mount surface 8a. The user can attach the battery pack 1 to the power tool body 8 by sliding the battery pack 1 forward relative to the power tool body 8. The user can then detach the battery pack 1 from the power tool body 8 by sliding the battery pack 1 backward relative to the power tool body 8.

As shown in FIGS. 1 and 2, the battery pack 1 includes a housing 2, a battery 3, a terminal unit 4, and an antenna 51.

The housing 2 has an internal space accommodating the battery 3 and the terminal unit 4. As illustrated in FIGS. 1 and 2, the housing 2 may include an upper member 21 and a lower member 22. The upper member 21 is a box open downward. The lower member 22 is a box open upward. The upper member 21 and the lower member 22 can be coupled together to define the internal space with their openings connected together. The upper member 21 and the lower member 22 coupled together define the housing 2.

The housing 2 described below has an upper wall 2a, a lower wall 2c, and a side wall 2b. The upper wall 2a faces the lower wall 2c in the up-down direction. The lower wall 2c is substantially plate-like and has a thickness substantially in the up-down direction. The side wall 2b connects the periphery of the upper wall 2a to the periphery of the lower wall 2c. As illustrated in FIG. 1, the housing 2 may have a rectangular prismatic profile. In this case, the upper wall 2a and the lower wall 2c are substantially rectangular in a plan view. The internal space of the housing 2 is defined by the upper wall 2a, the side wall 2b, and the lower wall 2c.

When the battery pack 1 is attached to the power tool body 8, the upper wall 2a of the housing 2 faces the battery mount surface 8a of the power tool body 8. As described in detail later, the upper wall 2a includes a connector 40 for electrical connection to the power tool body 8. As illustrated in FIG. 1, the upper wall 2a may include an engagement part 70 that allows detachable attachment to the power tool body 8. The user can attach the battery pack 1 to the power tool body 8 by placing the upper wall 2a to face the battery mount surface 8a and sliding the battery pack 1 forward. With the battery pack 1 being attached, the connector 40 is electrically connected to a connector (not shown) in the power tool body 8, and the engagement part 70 is engaged with an engagement part (not shown) in the power tool body 8.

The battery 3 is located inside the housing 2. In other words, the battery 3 is located in the internal space of the housing 2 defined by the upper wall 2a, the side wall 2b, and the lower wall 2c. As illustrated in FIG. 2, the battery 3 may include multiple battery cells 31, multiple conductors 32, and a cell holder 33. The battery cells 31 are secondary battery cells that can store electricity. For example, the battery cells 31 may be lithium ion battery cells. In an example in FIG. 2, the battery cells 31 are substantially cylindrical. Each battery cell 31 includes electrodes on its longitudinal two ends. Each electrode functions as a positive electrode or a negative electrode. In an example in FIG. 2, the multiple battery cells 31 have their length in the right-left direction. In an example in FIG. 2, five battery cells 31 are arranged in the front-rear direction, and two sets of the five battery cells 31 are arranged in the up-down direction. Thus, when viewed in the right-left direction, the battery cells 31 are arranged in a matrix of five rows and two columns.

The cell holder 33 holds the multiple battery cells 31 arranged as described above. The cell holder 33 is formed from an insulating material (e.g., resin). The cell holder 33 may be molded integrally with the battery cells 31. The number of battery cells 31 and their arrangement may be changed as appropriate.

The multiple conductors 32 electrically connect the multiple battery cells 31 to one another. Each conductor 32 is plate-like and formed from, for example, metal. Each conductor 32 connects the electrodes in the corresponding battery cells 31. For example, the conductors 32 may connect the battery cells 31 in series. A pair of conductors 32 connected to the electrodes at the two ends of the series-connected battery cells include electrodes 321. One electrode 321 functions as a positive electrode, and the other electrode 321 functions as a negative electrode. In an example in FIG. 2, one of the electrodes 321 is behind the terminal unit 4 and is not shown. The multiple conductors 32 may be fixed to, for example, the cell holder 33.

The connector 40 is located nearer the upper wall 2a than the battery 3. The connector 40 includes the terminal unit 4. As illustrated in FIG. 2, the terminal unit 4 is located inside the housing 2. The terminal unit 4 is located between the upper wall 2a of the housing 2 and the battery 3. In an example in FIG. 2, the terminal unit 4 is located at a front position on the battery 3.

The terminal unit 4 includes multiple connection terminals 41 and a terminal holder 42. The multiple connection terminals 41 come in contact with connection terminals (not shown) of a connector in the power tool body 8 when the battery pack 1 is attached to the power tool body 8. The battery pack 1 thus electrically connects to the power tool body 8. The connector 40 feeds power from the battery 3 to the power tool body 8. In an example in FIG. 2, five connection terminals 41 are arranged in the right-left direction, and two sets of the five connection terminals 41 are arranged in the up-down direction. When viewed in the front-rear direction, the connection terminals 41 are in a matrix of five rows and two columns. Each connection terminal 41 extends in the front-rear direction. The number of connection terminals 41 and their arrangement may be changed as appropriate.

The terminal holder 42 holds the basal ends (rear ends in FIG. 2) of the multiple connection terminals 41. The terminal holder 42 is formed from an insulating material (e.g., resin). The terminal holder 42 may be molded integrally with the connection terminals 41. The terminal holder 42 may be fixed to, for example, the cell holder 33.

Two of the multiple connection terminals 41 are connected to the positive electrode 321 and the negative electrode 321 of the battery 3 with wiring (not shown). These two connection terminals 41 thus function as connection terminals for power supply.

In an example in FIG. 2, the upper wall 2a of the housing 2 has an elevated portion including the terminal unit 4. More specifically, the upper wall 2a of the housing 2 has a base part 21a and a raised part 22a. The raised part 22a protrudes upward from the base part 21a. The raised part 22a forms a step with the base part 21a. The terminal unit 4 is located inside the raised part 22a. In other words, the terminal unit 4 faces the raised part 22a in the up-down direction and in the front-rear direction. As illustrated in FIG. 2, the raised part 22a of the housing 2 has, in its front end, slits H1 for connection to the connection terminals 41 in the terminal unit 4.

The raised part 22a of the housing 2 and the terminal unit 4 form the connector 40. When the battery pack 1 is attached to the power tool body 8, the connection terminals of the connector in the power tool body 8 are in contact with the connection terminals 41 through the slits H1. This allows power feeding to the power tool body 8 from the battery 3 through the connection terminals 41.

Although the connector 40 is a female connector in an above example, the connector 40 may be a male connector.

In an example shown in FIGS. 1 and 2, the upper wall 2a of the housing 2 includes the engagement part 70 for attachment to the power tool body 8. As illustrated in FIGS. 1 and 2, the engagement part 70 may include an engagement protrusion 211 and a pair of slide rails 212. The pair of slide rails 212 protrude outward from each end of the raised part 22a in the right-left direction. The slide rails 212 extend in the front-rear direction and fit in recesses (not shown) on the power tool body 8. The battery pack 1 is thus positioned relative to the power tool body 8 in the up-down direction. The user can move the battery pack 1 relative to the power tool body 8 along the slide rails 212. The engagement protrusion 211 protrudes upward from the upper surface of the housing 2. The engagement protrusion 211 is movable in the up-down direction and urged upward. To attach the battery pack 1, the engagement protrusion 211 is once pressed downward by the engagement part in the power tool body. As the battery pack 1 is slid to the attachment position relative to the power tool body 8, the engagement protrusion 211 moves upward and engages with the engagement part in the power tool body 8. This engagement attaches the battery pack 1 to the power tool body 8.

The antenna 51 allows wireless communication with other communication devices external to the battery pack 1. For example, the antenna 51 may be a metal plate (e.g., an aluminum foil) with a predetermined pattern.

The antenna 51 is located at the upper wall 2a, at the side wall 2b, or in an area in the internal space of the housing 2 other than the area between the battery 3 (or the battery cells 31) and the lower wall 2c. The area between the battery 3 and the lower wall 2c may also be hereafter referred to as an antenna-noninstalled area. In an example in FIG. 2, the dashed lines indicate the antenna-noninstalled area schematically. In a more specific example, the antenna 51 is located in a portion of the housing 2 other than the lower wall 2c. In an example in FIG. 2, the antenna 51 is located at the side wall 2b of the housing 2. The antenna 51 may be located on the outer peripheral surface of the side wall 2b. In this case, the antenna 51 may be covered with an insulating protective member. This protects the antenna 51 from the external environment. In another example, the antenna 51 may be embedded in the side wall 2b.

In still another example, the antenna 51 may be located at the upper wall 2a of the housing 2. More specifically, the antenna 51 may be located on the outer peripheral surface of the upper wall 2a or embedded in the upper wall 2a. The antenna 51 located at the upper wall 2a may be covered with an insulating protective member.

Figure 4:
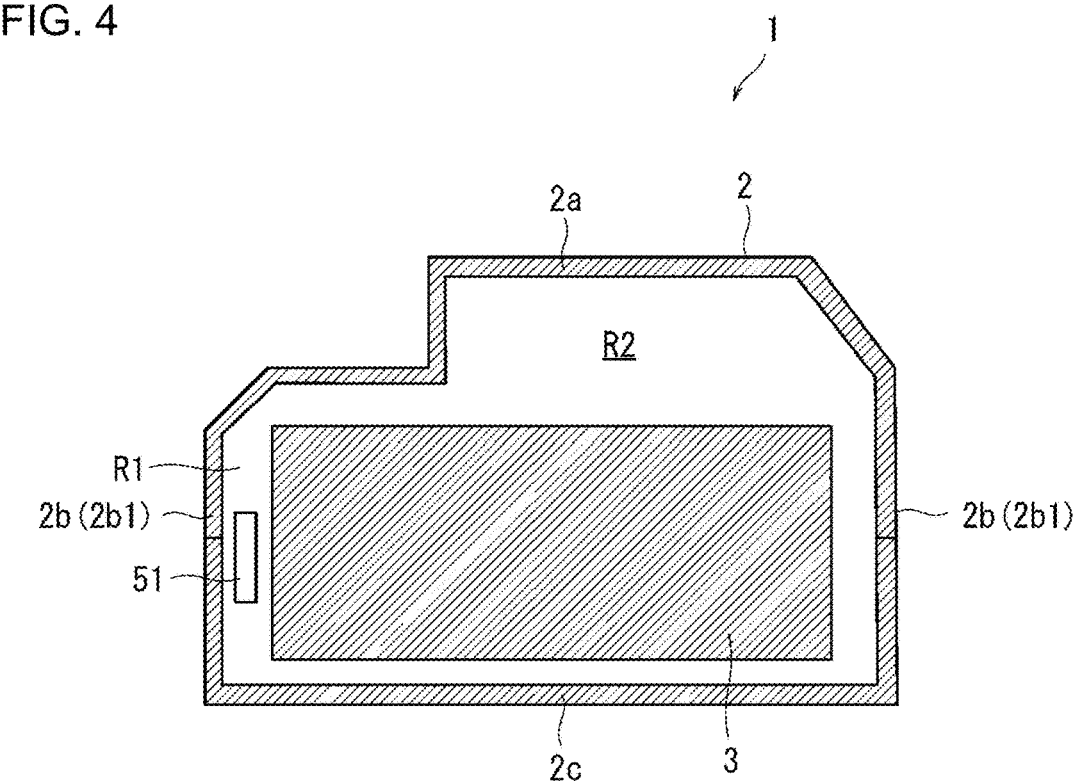
FIG. 4 illustrates a schematic cross-sectional view of a battery pack in an example.

In still another example, the antenna 51 may be located in the internal space of the housing 2 other than the antenna-noninstalled area. FIG. 4 is a schematic cross-sectional view of another example battery pack 1. FIG. 4 schematically shows a cross section of the battery pack 1 as viewed in the right-left direction. In FIG. 4, the terminal unit 4 is not shown. As illustrated in FIG. 4, the antenna 51 may be located in an area R1 between the side wall 2b of the housing 2 and the battery 3. The antenna 51 may be spaced from the side wall 2b as illustrated in FIG. 4 or located on the inner peripheral surface of the side wall 2b.

In still another example, the antenna 51 may be located in an area R2 between the upper wall 2a of the housing 2 and the battery 3. More specifically, the antenna 51 may be located on the inner peripheral surface of the upper wall 2a or spaced from the upper wall 2a.

Figure 5:
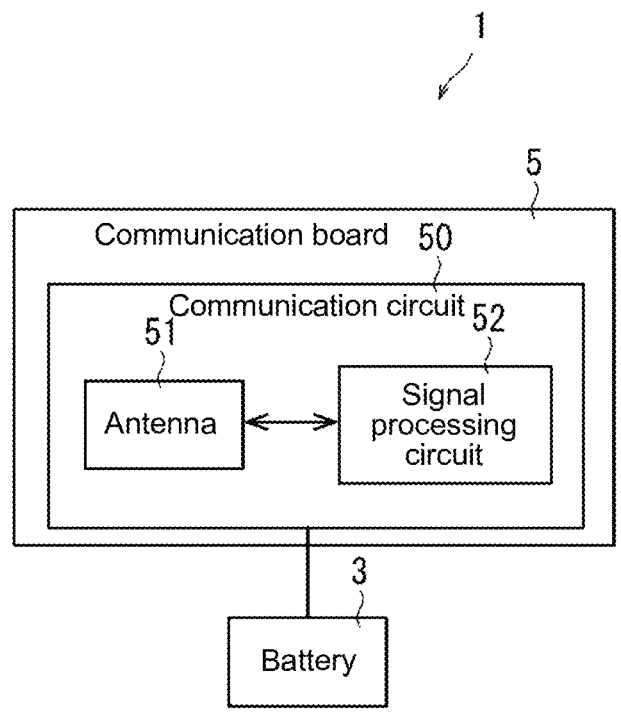
FIG. 5 illustrates a functional block diagram of a battery pack in an example, showing its electrical configuration.

FIG. 5 is a functional block diagram of the battery pack 1 in an example, schematically showing its electrical configuration. The antenna 51 is electrically connected to a signal processing circuit 52. The antenna 51 and the signal processing circuit 52 are included in a communication circuit 50. The communication circuit 50 may be mounted on a predetermined communication board 5.

Figure 6:
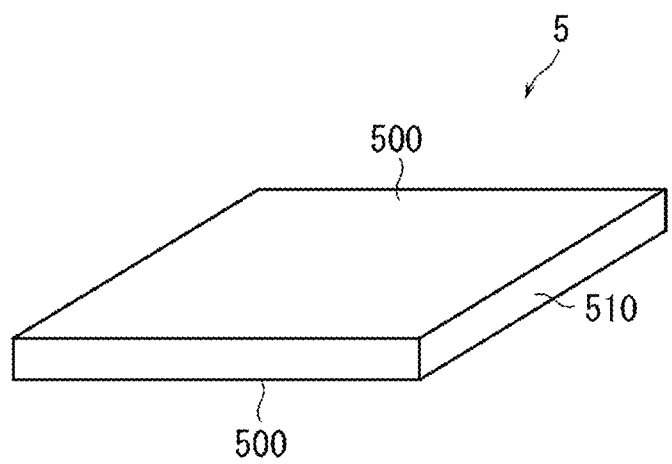
FIG. 6 illustrates a schematic view of a communication board in an example, showing its profile.

FIG. 6 is a schematic perspective view of the communication board 5 in an example, showing its external appearance. The communication board 5 is, for example, rectangular and has a pair of main surfaces 500 and side surfaces 510. At least one component included in the communication circuit 50 is mounted on one of the pair of main surfaces 500. The profile of the communication board 5 may be other than rectangular.

The communication circuit 50 complies with at least one wireless communication standard, and can wirelessly communicate with a communication device external to the battery pack 1 with the antenna 51. The communication device external to the battery pack 1 may be hereafter referred to as an external device. The external device may be located in, for example, a management center.

The communication circuit 50 may comply with wireless communication standards including standards for a wireless local area network (LAN), such as Wireless Fidelity (Wi-Fi). For example, the communication circuit 50 may comply with wireless communication standards including Bluetooth (registered trademark), ZigBee (registered trademark), and Near-Field Communication (NFC). The communication circuit 50 may comply with wireless communication standards including standards for a low-power wide-area (LPWA) network. For example, the communication circuit 50 may comply with wireless communication standards including SIGFOX (registered trademark), a LoRa (registered trademark) wide area network (WAN), and Narrowband Internet of Things (NB-IoT).

The signal processing circuit 52 includes at least one processor to provide control and processing capabilities for implementing various functions, as described in more detail below.

In various embodiments, the at least one processor may be a single integrated circuit (IC), multiple ICs connected to one another for mutual communication, and/or discrete circuits. The at least one processor may be implemented in accordance with various known technologies.

In one embodiment, the processor includes one or more circuits or units that perform one or more data computation procedures or processes by, for example, executing instructions stored in an associated memory. In another embodiment, the processor may be a piece of firmware (e.g., a discrete logic component) to perform one or more data computation procedures or processes.

In various embodiments, the processor may be one or more processors, controllers, microprocessors, microcontrollers, application-specific integrated circuits (ASICs), digital signal processors, programmable logic devices, field-programmable gate arrays, or may include any combination of these devices or components or any combination of other known devices and components, and may implement the functions described below.

All or some of the functions of the signal processing circuit 52 may be implemented with a hardware circuit that can implement such functions without software.

The signal processing circuit 52 performs various processes including amplification on a reception signal received by the antenna 51 and obtains data from the reception signal. The signal processing circuit 52 also performs various processes including amplification on a transmission signal including transmission data and wirelessly transmits the resultant transmission signal from the antenna 51.

The communication circuit 50 is powered by the battery 3. Although not shown in FIG. 5, a power supply circuit may convert the voltage from the battery 3 to a predetermined voltage.

The transmission data transmitted by the communication circuit 50 to an external device may include identification data for identification of the battery pack 1 (e.g., a serial number, a unique identification (ID) of the battery, and/or an ID indicating the type of the battery). The identification data may be preset and stored in a recording medium. The transmission data may also include remaining battery level data indicating the remaining power level of the battery 3. The remaining power level can be estimated based on the current flowing through the battery 3. The battery pack 1 may include a current sensor. The signal processing circuit 52 may estimate the remaining power level based on the current. When the battery pack 1 includes a temperature sensor that detects a temperature, the transmission data may include temperature data indicating the temperature detected by the temperature sensor. When the battery pack 1 can identify its position, the transmission data may include position data indicating the position of the battery pack 1. In this case, the battery pack 1 may include, for example, a Global Positioning System (GPS) receiver circuit that obtains position data of the battery pack 1 based on signals from GPS positioning satellites. The GPS receiver circuit may be included in the communication circuit 50. The battery pack 1 may also include, in addition to or instead of the GPS receiver circuit, a circuit for obtaining the position of the battery pack 1 based on signals from positioning satellites of global navigation satellite systems (GNSSs) other than GPS. Such a circuit may be included in the communication circuit 50. Examples of GNSSs other than GPS include the Global Navigation Satellite System (GLONASS), the Indian Regional Navigational Satellite System (IRNSS), COMPASS, Galileo, and the Quasi-Zenith Satellites System (QZSS).

The external device, for example, receives transmission data from multiple battery packs 1 and manages the battery packs 1 based on the received transmission data. For example, when the transmission data includes position data, the external device can manage the positions of the battery packs 1. The operator can thus identify the position of the battery pack 1 based on information from the external device. Additionally, any stolen battery pack 1 may be tracked.

The communication circuit 50 may transmit other items of transmission data in addition to the data described above. To save power, the communication circuit 50 may have transmission function alone, rather than having both reception and transmission function.

Figure 7:
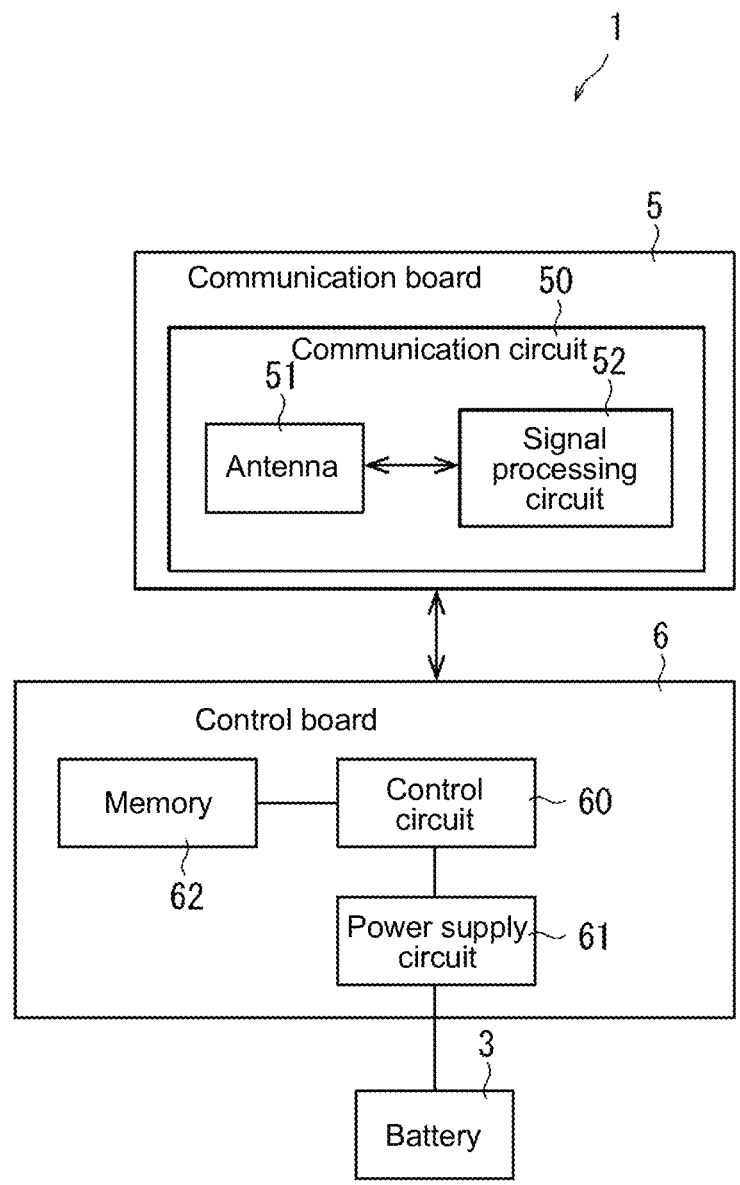
FIG. 7 illustrates a functional block diagram of a battery pack in an example, showing its electrical configuration.

The battery pack 1 may also include a control circuit 60. FIG. 7 is a functional block diagram of the battery pack 1 in another example, showing its electrical configuration. The control circuit 60 is electrically connected to the communication circuit 50. The control circuit 60 may be mounted, for example, on a control board 6 separate from the communication board 5. The control board 6 may also include a power supply circuit 61. The power supply circuit 61 receives a direct-current (DC) voltage input from the battery 3. The power supply circuit 61 converts the DC voltage to a predetermined DC voltage and outputs the resultant DC voltage to the control circuit 60. The power supply circuit 61 is, for example, a DC-DC converter. The control circuit 60 operates based on the resultant DC voltage.

The control circuit 60 includes at least one processor to implement various functions. The at least one processor included in the control circuit 60 may be implemented in the same manner as the at least one processor included in the signal processing circuit 52 is implemented as described above.

In an example in FIG. 7, the control board 6 includes a memory 62. The memory 62 stores various items of information collected by the battery pack 1. For example, when the battery pack 1 includes a current sensor that detects the current through the battery 3, the control circuit 60 may store the current value into the memory 62. In an example in FIG. 7, the memory 62 is mounted on the control board 6. In another example, the memory 62 may be mounted on the communication board 5 or at a location different from the boards.

The transmission data transmitted by the communication circuit 50 to the external device may be generated by the control circuit 60, by the signal processing circuit 52 in the communication circuit 50, or by the control circuit 60 and the signal processing circuit 52 in cooperation. The various sensors and the circuit for obtaining position data described above may be connected to the control circuit 60.

The battery pack 1 may be detached from the power tool body 8 and then placed on a predetermined placement surface as described below. More specifically, the battery pack 1 is placed on the placement surface typically in a posture in which the lower wall 2c faces the placement surface. The placement surface is, for example, a bottom surface of a storage (e.g., a shelf) for storing the battery pack 1. This storage in, for example, a factory stores multiple charged battery packs 1. A user selects a battery pack 1 from the storage, attaches the battery pack 1 to the power tool body 8, and starts working with the power tool 100.

The battery pack 1 detached from the power tool body 8 and placed on the placement surface can perform wireless communication with the external device. The battery pack 1 detached may also have high communication reliability.

For comparison, a battery pack including the antenna 51 in the antenna-noninstalled area, unlike the battery pack according to an embodiment, will now be described. The battery pack includes the antenna 51 between the battery 3 and the placement surface. The battery 3 and the placement surface can obstruct wireless communication, possibly reducing communication reliability. In particular, the placement surface formed from metal can greatly reduce communication reliability.

In contrast, the battery pack 1 includes the antenna 51 in an area other than the antenna-noninstalled area. In an example in FIG. 1, the antenna 51 is located at the side wall 2b of the housing 2. The antenna 51 at the position is not between the battery 3 and the placement surface, and thus has less obstacles to communication. This reduces any decrease in the communication reliability.

The antenna 51 may be located nearer the upper wall 2a than the lower wall 2c in the up-down direction. The antenna 51 at the position is away from the placement surface, thus further reducing any decrease in the communication reliability. The antenna 51 may be located at the upper wall 2a of the housing 2. The antenna 51 at the position is more away from the placement surface, thus further reducing any decrease in the communication reliability. For example, the antenna 51 located in the area R2 or at the upper wall 2a is more away from the placement surface, thus further reducing any decrease in the communication reliability.

As illustrated in FIG. 1, the antenna 51 may be at a corner of the housing 2. In an example in FIG. 1, the housing 2 has a substantially rectangular prismatic profile. The side wall 2b is a substantially rectangular tube. In other words, the side wall 2b includes multiple (four in an example) partial walls 2b1. Each partial wall 2b1 is plate-like and is connected to one peripheral side of the upper wall 2a and to one peripheral side of the lower wall 2c. Two adjacent partial walls 2b1 of the multiple partial walls 2b1 are also connected to each other. The joint between the partial walls 2b1 forms a corner. The antenna 51 may be located at the corner of the side wall 2b (at the joint between the partial walls 2b1). More specifically, in an example in FIG. 1, the antenna 51 is located at the front right corner of the side wall 2b. With the antenna 51 at the position, the components of the battery pack 1 use a small portion of the space frontward and rightward from the antenna 51. This structure further reduces obstacles to communication, thus improving communication reliability.

In an example in FIGS. 1 and 2, the periphery of the upper wall 2a and the periphery of the lower wall 2c in a plan view are substantially rectangular. In another example, the peripheries may be polygonal. When the polygon has N sides (N is an integer greater than or equal to 3), the side wall 2b includes N partial walls 2b1. The joint between adjacent ones of the N partial walls 2b1 also forms a corner, at which the antenna 51 may be located. This structure also improves communication reliability.

The antenna 51 may be located at the joint (corner) between the upper wall 2a and the side wall 2b. This structure also improves communication reliability.

Second Embodiment

Figure 8:
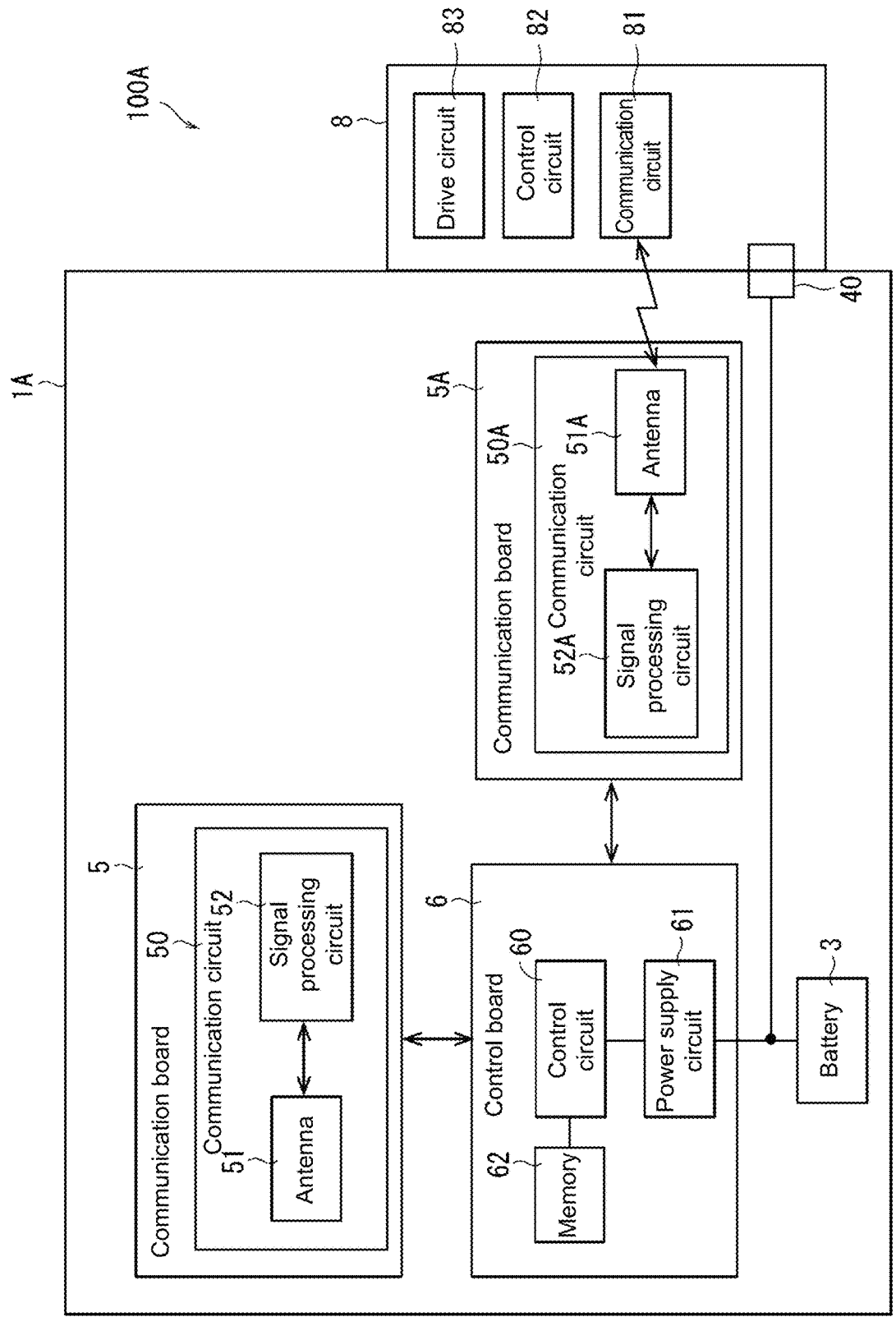
FIG. 8 illustrates a functional block diagram of a power tool in an example, showing its electrical configuration.

A battery pack 1A according to a second embodiment has the same structure as the battery pack 1. However, the battery pack 1A can communicate wirelessly also with the power tool body 8. FIG. 8 is a functional block diagram of a power tool 100A in an example, schematically showing its electrical configuration. The power tool 100A includes the battery pack 1A and the power tool body 8. As illustrated in FIG. 8, the battery pack 1A further includes a communication circuit 50A, unlike the battery pack 1. The communication circuit 50A can communicate with the power tool body 8.

As illustrated in FIG. 8, the communication circuit 50A may include an antenna 51A and a signal processing circuit 52A. The signal processing circuit 52A is connected to the antenna 51A. The signal processing circuit 52A has the same structure as the signal processing circuit 52. The signal processing circuit 52A can communicate with a communication circuit 81 in the power tool body 8 through the antenna 51A. As illustrated in FIG. 8, the antenna 51A and the signal processing circuit 52A may be mounted on a communication board 5A separate from the communication board 5.

The communication circuit 50A can wirelessly communicate with the power tool body 8 in accordance with at least one wireless communication standard (communication technique). The communication circuit 50A may comply with the same wireless communication standard as the communication circuit 50 described above.

The communication circuit 50A may comply with a wireless communication standard different from the wireless communication standard used by the communication circuit 50. For example, the communication circuit 50A may comply with a wireless communication standard having a shorter communication range than the wireless communication standard used by the communication circuit 50. The distance between the communication circuit 50A and the communication circuit 81 is shorter when the battery pack 1 is attached to the power tool body 8. The communication circuit 50 and the communication circuit 50A complying with different wireless communication standards are less likely to have communication interference between them. The communication circuit 50 and the communication circuit 50A can thus improve communication reliability.

The control circuit 60 is connected to the signal processing circuit 52 and the signal processing circuit 52A. For example, the control circuit 60 outputs data to be transmitted to the external device to the signal processing circuit 52, and outputs data to be transmitted to the power tool body 8 to the signal processing circuit 52A. For example, the control circuit 60 receives data from the external device through the signal processing circuit 52, and receives data from the power tool body 8 through the signal processing circuit 52A.

The power tool body 8 includes the communication circuit 81, a control circuit 82, and a drive circuit 83. The communication circuit 81 can wirelessly communicate with the communication circuit 50A in the battery pack 1. The communication circuit 81 has the same structure as the communication circuit 50A.

The drive circuit 83 drives a tool 8b. For example, the drive circuit 83 includes a motor and an inverter. The motor drives the tool 8b. The inverter outputs an alternating-current (AC) voltage to the motor at a variable frequency and variable amplitude. The motor rotates at a speed corresponding to the input AC voltage.

The control circuit 82 centrally controls the power tool body 8. The control circuit 82 outputs transmission data to the communication circuit 81 and receives reception data from the communication circuit 81. The control circuit 82 also controls the drive circuit 83. The control circuit 82 has the same structure as the control circuit 60.

The power tool body 8 and the battery pack 1 transmit and receive communication data including identification data for identification of the power tool body 8. The identification data includes type identification data for identification of the type of the power tool and/or unique identification data that is pre-specified for each power tool. The identification data is preset and stored in, for example, a storage medium in the control circuit 82. The power tool body 8 may incorporate a current sensor that detects a current flowing through the battery 3. In this case, the communication data may include current data indicating the current detected by the current sensor. The control circuit 60 may store various data items received from the power tool body 8 into the memory 62.

Figure 9:
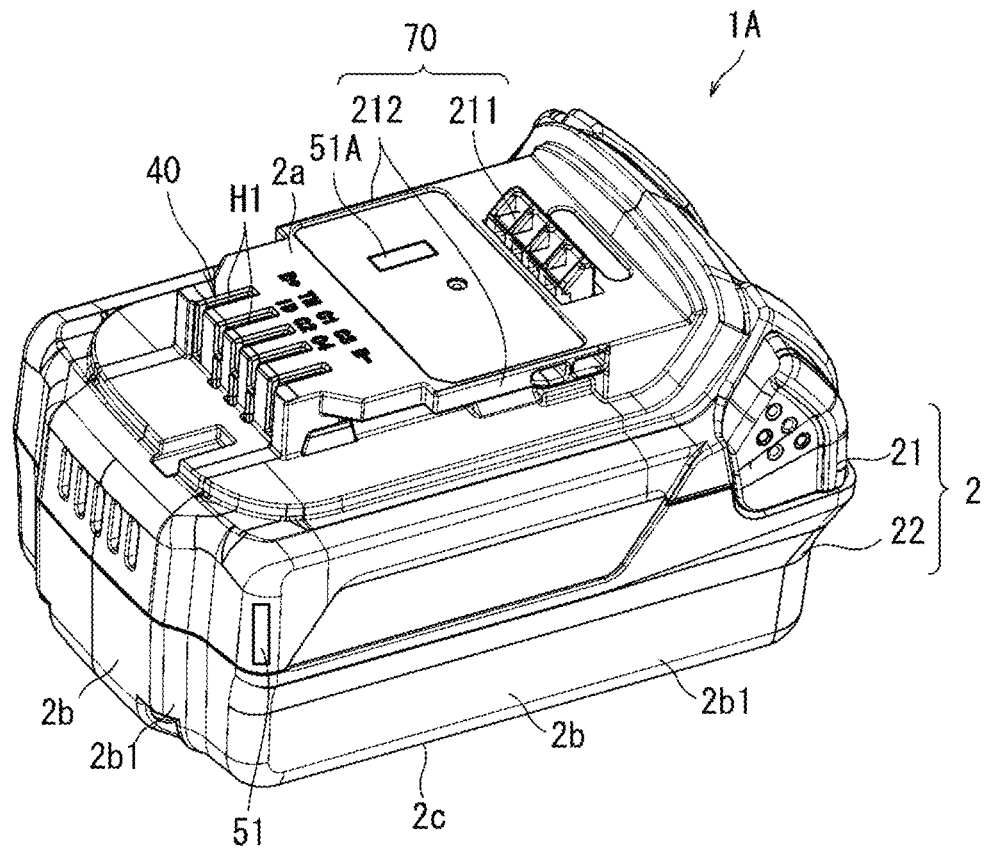
FIG. 9 illustrates a schematic perspective view of a battery pack in an example, showing its external appearance.

FIG. 9 is a schematic perspective view of the battery pack 1A in an example, showing its external appearance. The antenna 51A may be located at the upper wall 2a, at the side wall 2b, at the lower wall 2c, or in the internal space of the housing 2. In an example in FIG. 9, the antenna 51A is located at the upper wall 2a of the housing 2. More specifically, the antenna 51A may be located on the outer peripheral surface of the upper wall 2a, on the inner peripheral surface of the upper wall 2a, or embedded in the upper wall 2a. The antenna 51A located on the outer peripheral surface of upper wall 2a may be covered with an insulating protective member. In another example, the antenna 51A may be located in the area R2 between the upper wall 2a of the housing 2 and the battery 3 and spaced from the upper wall 2a.

The position of the antenna 51A may be above the battery 3 (or nearer the connector 40 than the battery 3). The antenna 51A nearer the connector 40 than the battery 3 is at a shorter distance from the communication circuit 81 in the power tool body 8. This improves the communication reliability of the communication circuit 50A.

As illustrated in FIG. 9, the antenna 51 may be located at the side wall 2b of the housing 2. More specifically, with the side wall 2b having the four partial walls 2b1, the antenna 51 may be located at a partial wall 2b1 of the four partial walls 2b1 other than the partial wall 2b1 nearest the antenna 51A. The antenna 51 at the position is at a longer distance from the antenna 51A, and thus is less susceptible to, for example, radio wave interference. Each of the communication circuit 50 and the communication circuit 50A can thus improve communication reliability.

The antenna 51 located in the area R1 between the side wall 2b of the housing 2 and the battery 3 may be spaced from the side wall 2b.

The antenna 51A may be located at a wall (including a partial wall) different from the wall at which the antenna 51 is located. This increases the distance between the antenna 51A and the antenna 51.

As described above, the power tool 100A includes the battery pack 1A that can communicate with the power tool body 8 and the external device with high reliability. One example of the communication will be described below.

Figure 10:
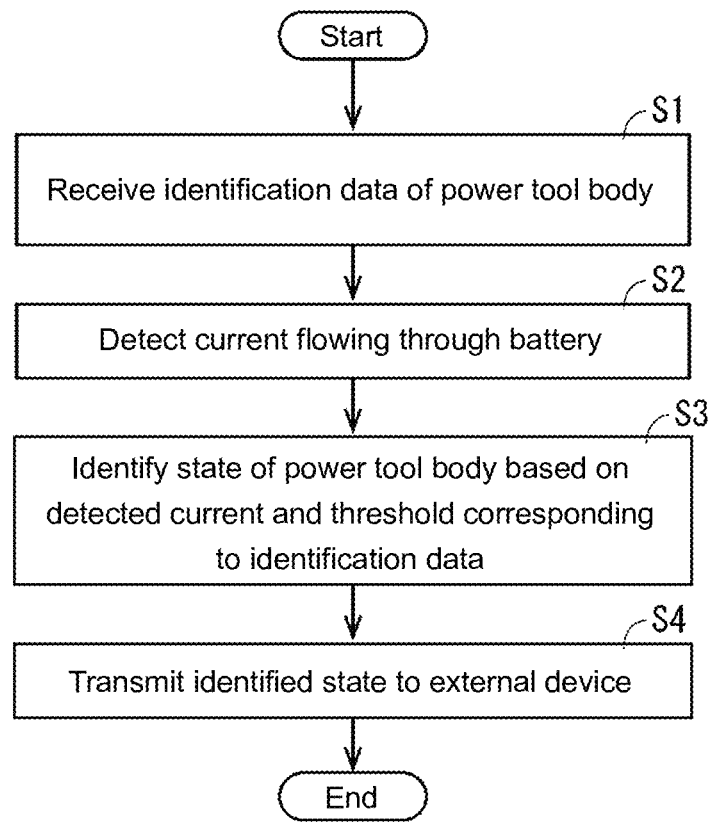
FIG. 10 illustrates a flowchart showing an operation of a power tool in an example.

FIG. 10 is a flowchart showing an operation of the power tool 100A in an example. The process in FIG. 10 is performed with the battery pack 1A being attached to the power tool body 8.

In step S1, the battery pack 1A first receives the identification data of the power tool body 8 from the power tool body 8. For example, the communication circuit 50A may transmit a request signal requesting the identification data to the communication circuit 81. The control circuit 82 receiving the request through the communication circuit 81 reads the identification data of the power tool body 8 from a recording medium. The control circuit 82 then transmits the identification data to the communication circuit 50A through the communication circuit 81. The control circuit 60 receives the identification data of the power tool body 8 through the communication circuit 50A.

In step S2, the current flowing through the battery 3 is detected. More specifically, a current sensor detects the current flowing from the battery 3 to the power tool body 8. The current sensor may be included in the battery pack 1A or in the power tool body 8. The current value detected by the current sensor is input into the control circuit 60 as a signal.

In step S3, the control circuit 60 identifies the state of the power tool body 8 based on the current flowing through the battery 3 and a threshold corresponding to the identification data of the power tool body 8. Examples of the state of the power tool body 8 include the drive count, or the number of times the power tool body 8 has driven the tool 8b. Each power tool body 8 uses a different current to drive the tool 8b. In other words, each power tool body 8 is determined to be in the driving operation with a different current threshold. Thus, the threshold is set in correspondence with the identification data of each power tool body 8. The threshold is stored into, for example, a storage medium in the control circuit 60.

The control circuit 60 reads, from the storage medium, the threshold corresponding to the identification data received from the power tool body 8. The control circuit 60 then determines whether the value of the current flowing through the battery 3 has changed from a value less than the threshold to a value greater than the threshold. In other words, the control circuit 60 determines whether the current value exceeds the threshold. Upon determining that the current value exceeds the threshold, the control circuit 60 increments the drive count by one and stores the drive count as count data into the recording medium in association with the identification data.

In step S4, the control circuit 60 outputs state data indicating the state of the power tool body 8 (in an example, information about the drive count or the count data), together with the associated identification data, to the communication circuit 50. The communication circuit 50 transmits the state data and the identification data to the external device.

This allows the external device to manage the state (e.g., the drive count) of each power tool body 8.

As described above, the control circuit 60 identifies the state of the power tool body 8 based on the current flowing through the battery 3 and the threshold corresponding to the power tool body 8. The threshold corresponding to the power tool body 8 enables highly accurate identification of the state of the power tool body 8.

The control circuit 60 may calculate the drive count per unit time (or drive frequency) for each power tool body 8 by dividing the drive count by the time. The state of each power tool body 8 may include the frequency data.

The control circuit 60 may determine whether the drive count is greater than a predetermined drive count. Upon determining that the drive count is greater than the predetermined drive count, the control circuit 60 may output, as one of the items of state data, a signal indicating the greater count to the communication circuit 50. This allows the external device to determine the power tool body 8 having the drive count exceeding the predetermined drive count. The predetermined drive count may be, for example, a drive count at which the power tool body 8 is likely to break due to aging. This count may be determined through, for example, experiments.

The state data may also include a cumulative drive duration of the power tool body 8. The cumulative drive duration herein refers to the sum of the driving durations of the power tool body 8, which repeatedly starts and stops driving. The battery 3 includes a timer. The control circuit 60 calculates the cumulative drive duration based on the current flowing through the battery 3 and the count of the timer, and outputs drive duration data indicating the cumulative drive duration as state data to the communication circuit 50. This allows the external device to manage the cumulative drive duration for each power tool body 8. Upon determining that the cumulative drive duration is greater than a predetermined drive duration (threshold), the control circuit 60 may output a signal indicating the greater drive duration to the communication circuit 50. This allows the external device to determine the power tool body 8 having the cumulative drive duration exceeding the predetermined drive duration. The predetermined drive duration may be, for example, a cumulative drive duration with which the power tool body 8 is likely to break due to aging. This duration may be determined through, for example, experiments.

Figure 11:
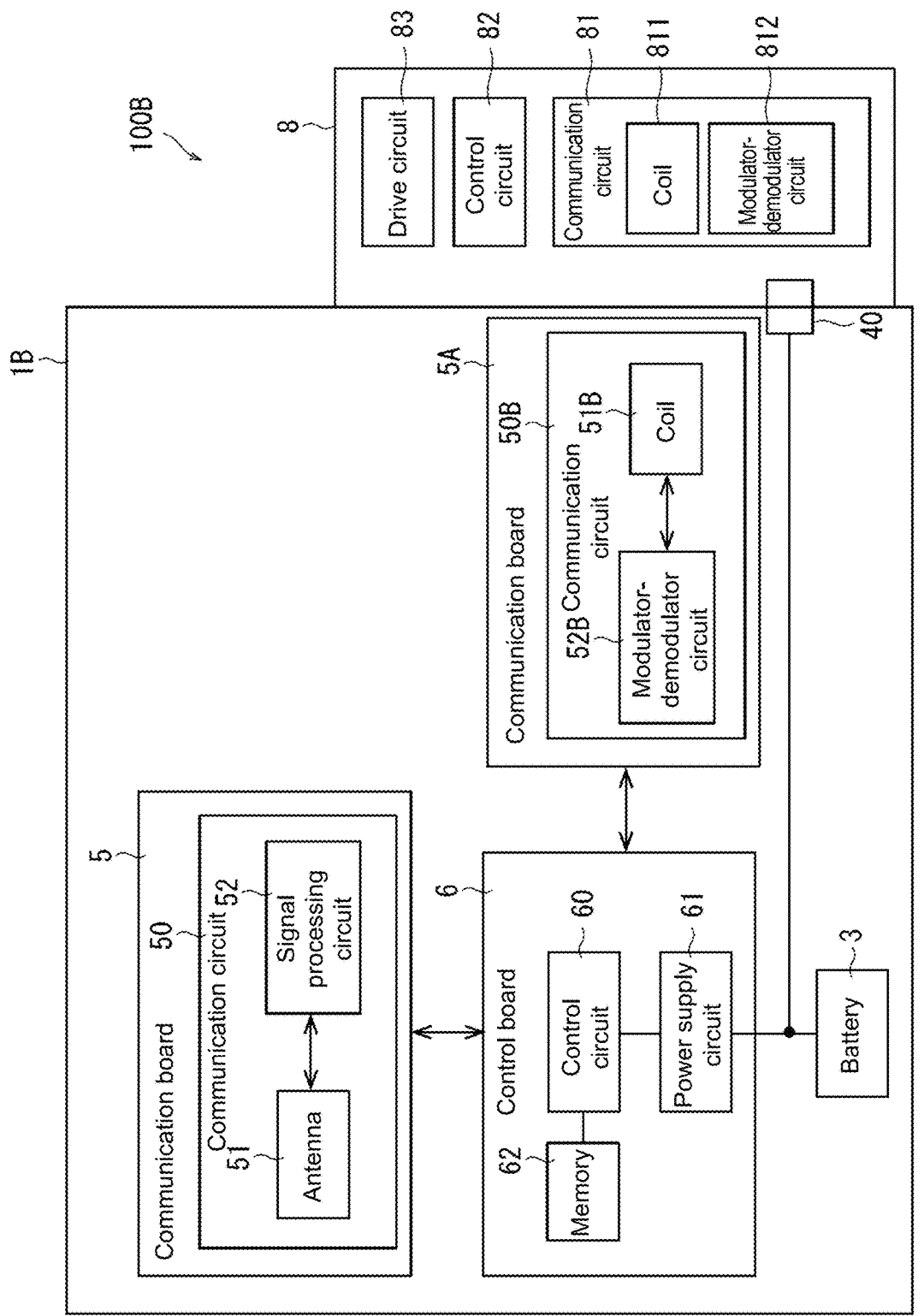
FIG. 11 illustrates a functional block diagram of a power tool in an example, showing its electrical configuration.

FIG. 11 is a functional block diagram of a power tool 100B in an example, showing its electrical configuration. The power tool 100B includes a battery pack 1B and the power tool body 8. The battery pack 1B includes a communication circuit 50B, instead of the communication circuit 50A. The communication circuit 50B includes a coil 51B and a modulator-demodulator circuit 52B. The coil 51B is located at the upper wall 2a of the battery pack 1B or in the area R2 between the upper wall 2a of the battery pack 1B and the battery 3. The coil 51B is located with its central axis extending in the up-down direction. The coil 51B is an antenna.

Similarly to the communication circuit 50B, the communication circuit 81 in the power tool body 8 also includes a coil 811 and a modulator-demodulator circuit 812. With the battery pack 1B attached to the power tool body 8, the coil 811 in the power tool body 8 faces the coil 51B in the up-down direction. The coil 811 is located to have its central axis substantially aligned with the central axis of the coil 51B. In response to an AC voltage being applied to one of the coil 51B or the coil 811, electromagnetic induction causes the other of the coil 51B or the coil 811 to also generate an AC voltage.

The modulator-demodulator circuit 52B modulates transmission data input from the control circuit 60 and outputs the resultant AC voltage to the coil 51B. This causes the coil 51B to generate magnetic flux. The magnetic flux is linked with the coil 811 to cause the coil 811 to generate an induced electromotive force. The modulator-demodulator circuit 812 demodulates the AC voltage across the coil 811 to demodulate the transmission data. The modulator-demodulator circuit 812 outputs the demodulated transmission data to the control circuit 82. This allows transmission of the transmission data from the battery pack 1B to the power tool body 8.

The modulator-demodulator circuit 812 modulates transmission data input from the control circuit 82 and outputs the resultant AC voltage to the coil 811. This causes an AC voltage across the coil 51B in the communication circuit 50B. The modulator-demodulator circuit 52B demodulates the AC voltage to demodulate the transmission data. The modulator-demodulator circuit 52B outputs the demodulated transmission data to the control circuit 60. This allows transmission of the transmission data from the power tool body 8 to the battery pack 1B.

In the battery pack 1B, the communication circuit 50B uses a communication technique (electromagnetic coupling) different from the communication technique (radio wave transmission) used by the communication circuit 50. Thus, the circuits are less likely to have communication interference between them than the circuits using the same communication technique. Each of the communication circuit 50 and the communication circuit 50B can thus improve communication reliability.

In the battery pack 1B, the antenna 51 may also be located at the side wall 2b of the housing 2 or in the area R1 between the side wall 2b and the battery 3. More specifically, the antenna 51 may be located in a portion of the side wall 2b other than the portion nearest the coil 51B. The antenna 51 at the position is at a longer distance from the coil 51B, and thus is less susceptible to, for example, radio wave interference. Each of the communication circuit 50 and the communication circuit 50B can thus improve communication reliability.

The battery pack 1B and the power tool body 8 may use a communication technique other than electromagnetic coupling or radio wave transmission. For example, the communication technique may be infrared communication. In this case, the communication circuit includes an infrared light source that outputs infrared rays and a receiver that receives the infrared rays. In some embodiments, the communication may be performed with wires instead of being performed wirelessly. For example, a power feed path in the battery 3 may be used for power-line carrier communication.

As illustrated in FIG. 1, the battery pack 1 may include an indicator 9. The indicator 9 is controlled by the control circuit 60. The indicator 9 can indicate externally (for example, to an operator) whether communication is possible between the battery pack 1 and an external device. For example, the indicator 9 includes a speaker that outputs sound or a light emitter (e.g., light-emitting diode or LED) that emits light. In an example in FIG. 1, the indicator 9 is located on the side wall 2b of the housing 2. The indicator 9 at the position remains uncovered when the battery pack 1 is attached to the power tool body 8 or to other power tool bodies in different shapes. The indicator 9 as a light emitter can thus easily show light to the surroundings. The indicator 9 as a speaker can easily provide a sound to the surroundings.

The indicator 9 located on a front partial wall 2b1 of the battery pack 1 in an example in FIG. 1 may be located at different positions. In another example, the indicator 9 may be located on a rear partial wall 2b1 of the battery pack 1. The rear partial wall 2b1 remains uncovered when the battery pack 1 is attached to any power tool body. The operator slides the battery pack 1 forward relative to the power tool body to attach the battery pack 1 to the power tool body. Thus, the rear partial wall 2b1 of the battery pack 1 typically remains uncovered and exposed from the power tool body. The indicator 9 as a light emitter can thus easily show light to the surroundings. The indicator 9 as a speaker can easily provide sound to the surroundings.

The control circuit 60 can determine whether communication is possible between the communication circuit 50 and the external device. For example, the control circuit 60 transmits, to the external device, a request signal requesting a response from the external device through the communication circuit 50. When the communication circuit 50 does not receive a signal from the external device within a predetermined period from the transmission of the request signal, the control circuit 60 determines that communication is not possible between the communication circuit 50 and the external device. Upon determining that the communication is not possible, the control circuit 60 causes the indicator 9 to indicate that the communication is not possible. This allows the operator to know that communication is not possible between the battery pack 1 and the external device.

The indicator 9 may notify the operator of whether communication is possible between the battery pack 1 and the power tool body 8. The control circuit 60 may determine whether communication is possible between the communication circuit 50A or 50B and the communication circuit 81. For example, the control circuit 60 transmits a request signal requesting a response from the power tool body 8 to the communication circuit 81 through the communication circuit 50A or 50B. When the communication circuit 50A or 50B does not receive a signal from the power tool body 8 within a predetermined period from the transmission of the request signal, the control circuit 60 determines that communication is not possible between the communication circuit 50A or 50B and the power tool body 8. Upon determining that the communication is not possible, the control circuit 60 causes the indicator 9 to indicate that the communication is not possible. This allows the operator to know that communication is not possible between the battery pack 1 and the power tool body 8.

The indicator 9 as a light emitter may include a first light emitter for indicating whether the communication is possible between the communication circuit 50 and the external device, and a second light emitter for indicating whether the communication is possible between the communication circuit 50 and the power tool body 8. In other words, the battery pack 1 may include a light emitter (indicator) dedicated to indicating whether the communication is possible for the external device and a light emitter (indicator) dedicated to indicating whether the communication is possible for the power tool body 8. In another example, the indicator 9 may include a single light emitter. The indicator 9 may use at least one of blinking patterns or colors of the light emitter to indicate whether the communication is possible between the communication circuit 50 and the external device and whether the communication is possible between the communication circuit 50 and the power tool body 8. The indicator 9 as a speaker may also include speakers each dedicated to the external device or the power tool body 8 or include a speaker for one of the external device or the power tool body 8.

As illustrated in FIG. 3, the power tool body 8 may include an indicator 91. The indicator 91 can indicate externally (for example, to an operator) whether communication is possible between the battery pack 1 and the power tool body 8. The indicator 91 may be located on a surface of the housing of the power tool body 8 other than on the battery mount surface 8a. As illustrated in FIG. 3, the indicator 91 may be located in a portion of a member of the housing of the power tool body 8 below the grip 8c grippable by an operator. The member receives the battery pack 1.

The control circuit 82 may determine whether communication is possible between the communication circuit 50A or 50B and the communication circuit 81. For example, the control circuit 82 transmits a request signal requesting a response from the battery pack 1 to the communication circuit 50 or to the communication circuit 50A or 50B through the communication circuit 81. When the communication circuit 81 does not receive a signal from the battery pack 1 within a predetermined period from the transmission of the request signal, the control circuit 82 determines that communication is not possible between the battery pack 1 and the power tool body 8. Upon determining that the communication is not possible, the control circuit 82 causes the indicator 91 to indicate that the communication is not possible. This allows the operator to know that communication is not possible between the battery pack 1 and the power tool body 8.

The battery pack and power tool have been described in detail as above, but the foregoing structures are illustrative in all respects, and the disclosure is not limited to the above structures. All the features of some embodiments and the modifications described above may be combined in use unless any contradiction arises. Many modifications not specifically described above may be implemented without departing from the scope of the disclosure.

The invention claimed is:

1. A battery pack for a power tool, the battery pack comprising:
a housing attachable to a power tool body in a detachable manner, the housing including
a first wall,
a second wall opposite to the first wall, and
a third wall connecting a periphery of the first wall to a periphery of the second wall;
at least one battery located in an internal space of the housing defined by the first wall, the second wall, and the third wall;
a connector located nearer the first wall than the at least one battery to feed power from the at least one battery to the power tool body;
a first antenna;
a second antenna located at the first wall, at the second wall, at the third wall, or in the internal space;
a first communication circuit configured to perform communication through the first antenna; and
a second communication circuit configured to perform communication with the power tool body through the second antenna, wherein
the first antenna is located at the first wall, at the third wall, or in an area in the internal space other than an area between the at least one battery and the second wall.

2. The battery pack according to claim 1, wherein
the periphery of the first wall is polygonal,
the third wall includes a plurality of partial walls connected to the periphery of the first wall, and
the first antenna is located (i) at a joint between the first wall and the third wall, or (ii) at a joint between two adjacent partial walls of the plurality of partial walls.

3. The battery pack according to claim 1, wherein
the first communication circuit is configured to perform communication, through the first antenna, with an external device different from the power tool body, and
the first antenna is located at the third wall, or between the at least one battery and the third wall.

4. The battery pack according to claim 1, further comprising:
a first indicator configured to indicate externally whether communication is possible with the first communication circuit.

5. The battery pack according to claim 1, wherein
the periphery of the first wall is polygonal,
the third wall includes a plurality of partial walls connected to the periphery of the first wall,
the first antenna is located at the first wall or at a partial wall of the plurality of partial walls, and
the second antenna is located at the first wall or at a partial wall of the plurality of partial walls that is different from the wall at which the first antenna is located.

6. The battery pack according to claim 1, wherein
the second antenna is located at the first wall or between the first wall and the at least one battery.

7. The battery pack according to claim 1, wherein
the first communication circuit is configured to perform communication with a first communication technique, and
the second communication circuit is configured to perform communication with a second communication technique different from the first communication technique.

8. The battery pack according to claim 1, wherein
the second antenna includes a coil.

9. The battery pack according to claim 1, further comprising:
a second indicator configured to indicate externally whether communication is possible with the second communication circuit.

10. The battery pack according to claim 1, wherein
the second communication circuit is configured to receive identification data to identify the power tool body from the power tool body, and
the battery pack further includes a control circuit configured to output, to the first communication circuit, state data indicating a state of the power tool body, the state of the power tool body obtained by comparing a current through the at least one battery and a current threshold corresponding to the identification data.

11. The battery pack according to claim 10, wherein
the state data includes information about a drive count of the power tool body.

12. The battery pack according to claim 11, wherein
the control circuit is configured to, upon determining that a cumulative drive duration of the power tool body exceeds a predetermined threshold, output a signal indicating that the cumulative drive duration exceeds the predetermined threshold to the first communication circuit.

13. A power tool, comprising:
a power tool body; and
a battery pack including
a housing attachable to the power tool body in a detachable manner, the housing including
a first wall,
a second wall opposite to the first wall, and
a third wall connecting a periphery of the first wall to a periphery of the second wall;
at least one battery located in an internal space of the housing defined by the first wall, the second wall, and the third wall;
a connector located nearer the first wall than the at least one battery to feed power from the at least one battery to the power tool body;
a first antenna;
a second antenna located at the first wall, at the second wall, at the third wall, or in the internal space;
a first communication circuit configured to perform communication through the first antenna; and
a second communication circuit configured to perform communication with the power tool body through the second antenna, wherein the first antenna is located at the first wall, at the third wall, or in an area in the internal space other than an area between the at least one battery and the second wall; and the power tool body comprises:
- a third communication circuit configured to communicate with the second communication circuit, and
- a third indicator configured to indicate externally whether communication is possible between the second communication circuit and the third communication circuit.

14. A power tool, comprising:

a power tool body; and a battery pack including:
- a housing attachable to the power tool body in a detachable manner, the housing including
  - a first wall,
  - a second wall opposite to the first wall, and
  - a third wall connecting a periphery of the first wall to a periphery of the second wall;
- at least one battery located in an internal space of the housing defined by the first wall, the second wall, and the third wall;
- a connector located nearer the first wall than the at least one battery to feed power from the at least one battery to the power tool body;
- a first antenna;
- a second antenna located at the first wall, at the second wall, at the third wall, or in the internal space;
- a first communication circuit configured to perform communication through the first antenna; and
- a second communication circuit configured to perform communication with the power tool body through the second antenna, wherein the first antenna is located at the first wall, at the third wall, or in an area in the internal space other than an area between the at least one battery and the second wall.

* * * * *